(12) United States Patent
Zhao

(10) Patent No.: US 12,232,087 B2
(45) Date of Patent: Feb. 18, 2025

(54) DIRECT LINK-BASED TRANSMISSION METHOD AND APPARATUS

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 535 days.

(21) Appl. No.: 17/295,013

(22) PCT Filed: Nov. 23, 2018

(86) PCT No.: PCT/CN2018/117111
§ 371 (c)(1),
(2) Date: May 18, 2021

(87) PCT Pub. No.: WO2020/103117
PCT Pub. Date: May 28, 2020

(65) Prior Publication Data
US 2022/0015080 A1     Jan. 13, 2022

(51) Int. Cl.
*H04W 72/044*     (2023.01)
*H04L 5/00*     (2006.01)

(52) U.S. Cl.
CPC ......... *H04W 72/044* (2013.01); *H04L 5/0048* (2013.01)

(58) Field of Classification Search
CPC ........................... H04W 72/044; H04L 5/0048
USPC ........................................ 370/310, 328, 329
See application file for complete search history.

(56) References Cited

U.S. PATENT DOCUMENTS

| 2015/0280876 A1 | 10/2015 | You et al. |
| 2016/0309466 A1 | 10/2016 | Chen et al. |
| 2018/0199268 A1 | 7/2018 | Wang et al. |
| 2019/0159181 A1* | 5/2019 | Manolakos ........... H04W 72/23 |
| 2019/0173646 A1* | 6/2019 | Wu ..................... H04L 25/0224 |
| 2019/0349158 A1* | 11/2019 | Wang .................... H04W 4/027 |

(Continued)

FOREIGN PATENT DOCUMENTS

| CN | 102057612 A | 5/2011 |
| CN | 106937388 A | 7/2017 |
| CN | 107431963 A | 12/2017 |

(Continued)

OTHER PUBLICATIONS

International Search Report issued in PCT Application No. PCT/CN2018/117111 dated Mar. 27, 2019 with English translation, (4p).

(Continued)

*Primary Examiner* — Obaidul Huq
(74) *Attorney, Agent, or Firm* — Arch & Lake LLP

(57) ABSTRACT

The present disclosure provides sidelink-based transmission methods and apparatuses. A method includes: configuring a demodulation reference signal shared by control information and target data, where the target data indicates to-be-transmitted data associated with the control information; mapping the control information, the target data, and the demodulation reference signal onto a current time unit by using time-division multiplexing; and transmitting the control information, the target data, and the demodulation reference signal to a receiver through the time unit.

20 Claims, 18 Drawing Sheets

(56) References Cited

U.S. PATENT DOCUMENTS

2020/0119881 A1* 4/2020 Xia .................... H04L 1/00
2021/0273763 A1* 9/2021 Wang .................. H04W 4/40

FOREIGN PATENT DOCUMENTS

| | | | |
|---|---|---|---|
| CN | 107454673 A | 12/2017 | |
| CN | 107889263 A | 4/2018 | |
| CN | 108352973 A | 7/2018 | |
| WO | 2009150177 A2 | 12/2009 | |
| WO | 2017178993 A1 | 10/2017 | |
| WO | 2018031061 A1 | 2/2018 | |
| WO | 2018084239 A1 | 5/2018 | |

OTHER PUBLICATIONS

State Intellectual Property Office of the People's Republic of China, Office Action and Search Report Issued in Application No. 201880002597.X, Feb. 1, 2021 with English translation, (10p).

CATT, "On D2D communication", 3GPP TSG RAN WG1 Meeting #73, Fukuoka, Japan, R1-131897, May 20-24, 2013, (6p).

CATT, "Considerations on D2D communication", 3GPP TSG RAN WG1 Meeting #74, Barcelona, Spain, R1-133030, Aug. 19-23, 2013, (6p).

ISA State Intellectual Property Office of the People's Republic of China, Written Opinion of the International Searching Authority Issued in Application No. PCT/CN2018/117111, Mar. 27, 2019, WIPO, 9 pages.

LG Electronics, "Considerations on Reference Signal for Control Channel", 3GPP TSG RAN WG1 Meeting #87 Reno, USA, R1-1611815, Nov. 14-18, 2016, 3 pages.

LG Electronics, "Status report of WI: Support for V2V services based on LTE sidelink rapporteur: LG Electronics", 3GPP TSG RAN meeting #72, RP-160792 Busan, Korea, Jun. 13-16, 2016, 23 pages.

European Patent Office, Extended European Search Report Issued in Application No. 18940709.1, Nov. 11, 2021 Germany, 9 pages.

First Office Action issued to EP Application No. 18940709.1 dated May 25, 2023 (6p).

First Office Action issued to Indian Application No. 202147024322 dated Feb. 23, 2022 with partial English translation, (7p).

\* cited by examiner

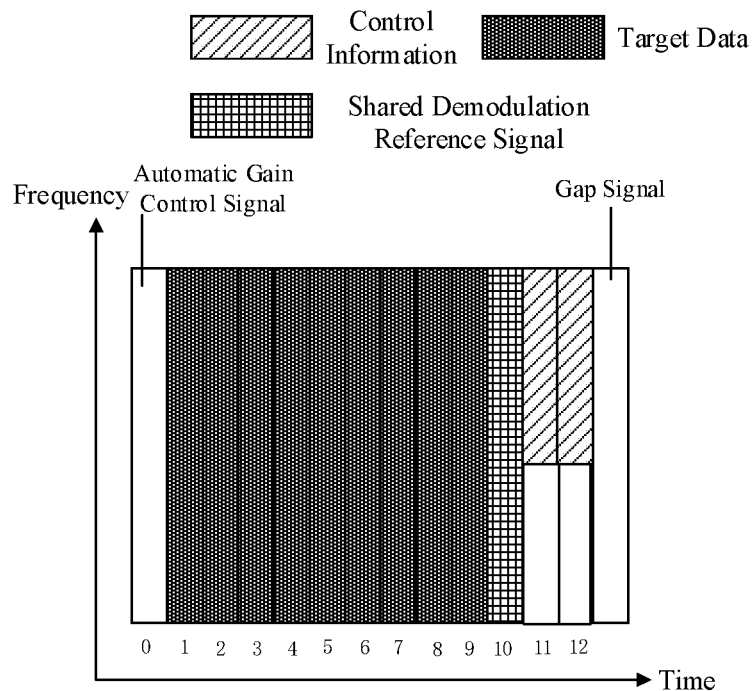

FIG. 4D

| Map the control information and the target data onto different time symbols of the time unit by using time-division multiplexing, where the last time symbol onto which the control information is mapped is adjacent to the beginning time symbol onto which the target data is mapped | ←102-21 |

↓

| Map the demodulation reference signal onto at least one second target time symbol of the time unit | ←102-22 |

FIG. 5

DIRECT LINK-BASED TRANSMISSION METHOD AND APPARATUS

CROSS-REFERENCE TO RELATED APPLICATION

This application is the national phase application of International Application No. PCT/CN2018/117111, filed on Nov. 23, 2018, the content of which is incorporated herein by reference in its entirety for all purposes.

TECHNICAL FIELD

The present disclosure relates to the communication field, and in particular to sidelink-based transmission methods and apparatuses.

BACKGROUND

In Release 15 (Rel 15) on New Radio (NR), a demodulation reference signal (DMRS) corresponding to a control channel for carrying control information and a DMRS corresponding to a data channel for carrying data are configured separately. When the control channel and the data channel are transmitted in a same time unit, such as a slot, their corresponding DMRSs are configured to be transmitted in respective channels, as illustrated in FIG. 1, which illustrates an example of transmitting a Physical Downlink Control Channel (PDCCH) and a Physical Downlink Shared Channel (PDSCH) in a same slot in an NR system.

A sidelink communication, compared with an uplink or downlink communication of the NR system, has a relatively simple control channel format. For example, only one sidelink control information format is defined on LTE-V2X (Vehicle to Everything). In addition, according to LTE-V2X, a sidelink control channel and a sidelink data channel are always transmitted in the same time unit in frequency-division multiplexing (FDM), as illustrated in FIG. 2, so as to reduce an impact of half duplex on V2X communication performance.

SUMMARY

In order to overcome the problems in the related art, embodiments of the present disclosure provide sidelink-based transmission methods and apparatuses.

According to a first aspect of the present disclosure, there is provided a sidelink-based transmission method. The method includes that a transmitter configures a demodulation reference signal shared by control information and target data. The target data indicates to-be-transmitted data associated with the control information. Further, the method includes that the transmitter maps the control information, the target data, and the demodulation reference signal onto a time unit by using time-division multiplexing and transmits the control information, the target data, and the demodulation reference signal to a receiver through the time unit.

According to a second aspect of the present disclosure, there is provided a sidelink-based transmission method. The method includes that a receiver receives control information, target data, and a demodulation reference signal which are transmitted by a transmitter through a time unit. The target data is associated with the control information, the demodulation reference signal is shared by the control information and the target data, and the control information, the target data, and the demodulation reference signal are mapped onto the time unit by using time-division multiplexing. Further, the method includes that the receiver demodulates the control information and the target data respectively from the time unit based on the demodulation reference signal.

According to a third aspect of the present disclosure, there is provided a sidelink-based transmission apparatus. The apparatus includes a processor and a memory configured to store instructions executable by the processor.

The processor is configured to: configure a demodulation reference signal shared by control information and target data, where the target data indicates to-be-transmitted data associated with the control information; map the control information, the target data, and the demodulation reference signal onto a time unit by using time-division multiplexing; and transmit the control information, the target data, and the demodulation reference signal to a receiver through the time unit.

According to a fourth aspect of the present disclosure, there is provided a sidelink-based transmission apparatus. The apparatus includes a processor and a memory configured to store instructions executable by the processor.

The processor is configured to: receive control information, target data, and a demodulation reference signal which are transmitted by a transmitter through a time unit, where the target data is associated with the control information, the demodulation reference signal is shared by the control information and the target data, and the control information, the target data, and the demodulation reference signal are mapped onto the time unit by using time-division multiplexing; and demodulate the control information and the target data respectively from the time unit based on the demodulation reference signal.

It should be understood that the above general description and the following detailed description are only exemplary and explanatory and are not restrictive of the present disclosure.

BRIEF DESCRIPTION OF THE DRAWINGS

The drawings herein are incorporated into the specification and constitute a part of the specification, illustrate examples in accordance with the present disclosure, and together with the specification are used to explain the principle of the present disclosure.

FIG. 4A to FIG. 4D are schematic diagrams illustrating sidelink-based transmission scenarios according to an example.

FIG. 5 is a flowchart illustrating another sidelink-based transmission method according to an example.

DETAILED DESCRIPTION OF THE EMBODIMENTS

Figure 1:
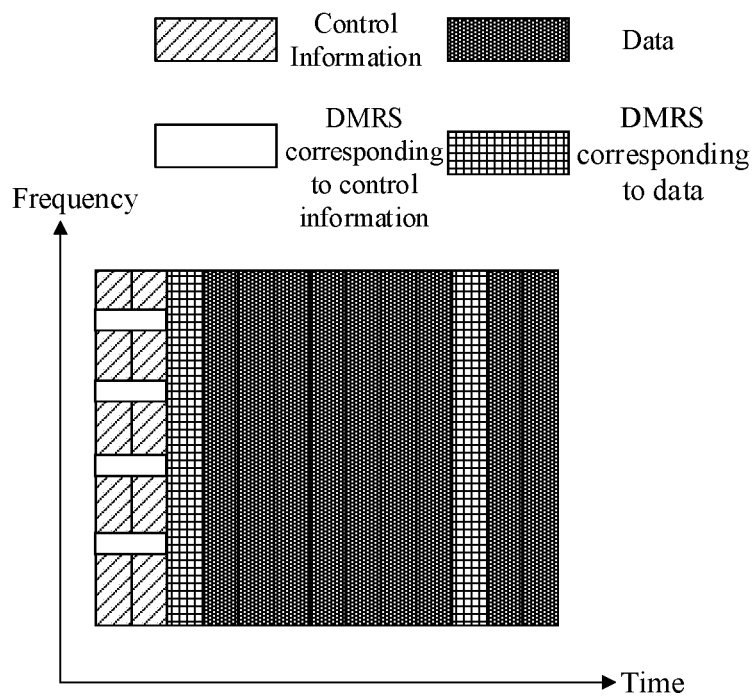
FIG. 1 is a schematic diagram illustrating a sidelink-based transmission scenario in related art according to an example.
Figure 2:
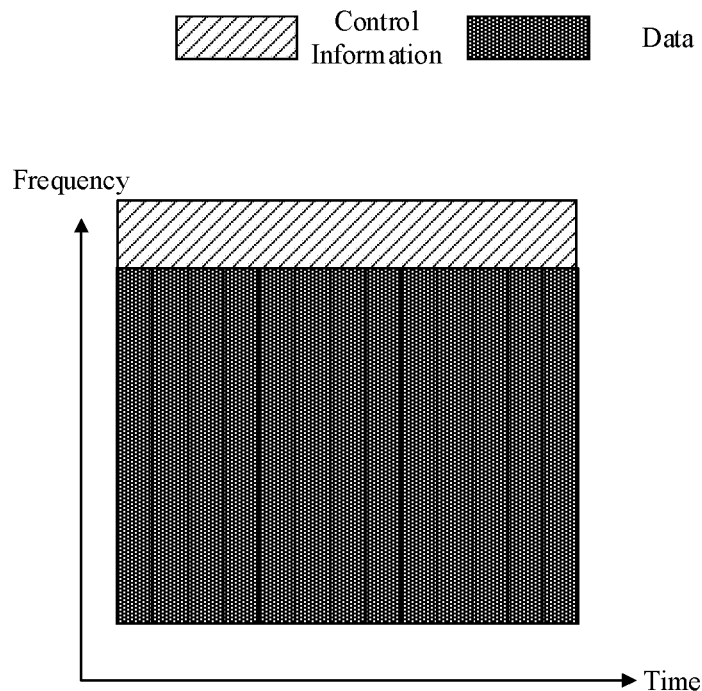
FIG. 2 is a schematic diagram illustrating another sidelink-based transmission scenario in related art according to an example.

Examples will be described in detail herein, with the illustrations thereof represented in the drawings. When the following descriptions involve the drawings, like numerals in different drawings refer to like or similar elements unless otherwise indicated. The implementations described in the following examples do not represent all the implementations consistent with the present disclosure. Rather, they are merely examples of apparatuses and methods consistent with some aspects of the present invention as detailed in the appended claims.

The terms used in the present disclosure are only for the purpose of describing specific examples, and are not intended to limit the present disclosure. The singular forms "a", "said" and "the" used in the present disclosure and appended claims are also intended to include plural forms, unless the context clearly indicates other meanings. It should further be understood that the term "and/or" used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, first information may be referred as second information; and similarly, second information may also be referred as first information. Depending on the context, the word "if" as used herein can be interpreted as "upon" or "when" or "in response to determining".

In the examples of the present disclosure, an involved time unit may be such a unit as a subframe or a slot, and an involved time symbol may be an orthogonal frequency-division multiplexing (OFDM) symbol.

Next, sidelink-based transmission methods provided by the examples of the present disclosure are firstly introduced from a side of a transmitter.

Figure 3:
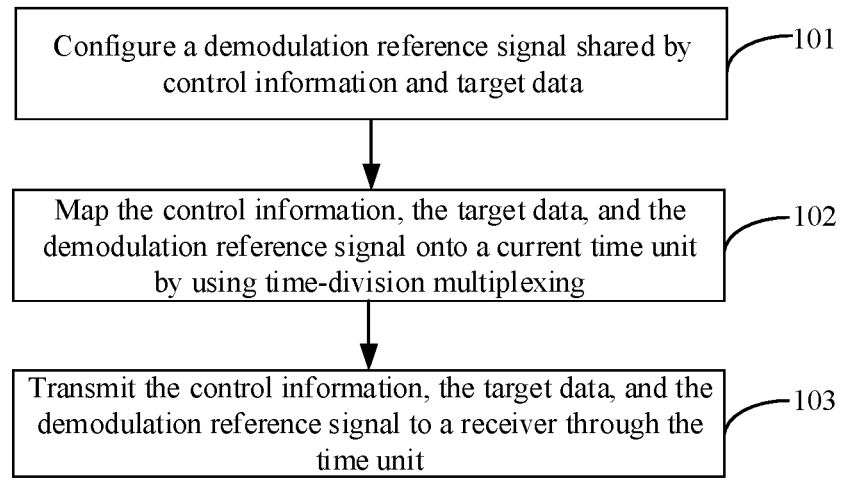
FIG. 3 is a schematic flowchart illustrating a sidelink-based transmission method according to an example.

In an example of the present disclosure, a sidelink-based transmission method is provided and applicable to the transmitter. Referring to FIG. 3, which is a flowchart illustrating a sidelink-based transmission method according to the example, the following steps may be included.

At step 101, a demodulation reference signal shared by control information and target data is configured. The target data indicates to-be-transmitted data associated with the control information.

At step 102, the control information, the target data, and the demodulation reference signal are mapped onto a current time unit by using time-division multiplexing.

At step 103, the control information, the target data, and the demodulation reference signal are transmitted to a receiver through the time unit.

In the above example, it succeeds in transmitting the control information, the target data, and the demodulation reference signal on the basis of time-division multiplexing in a sidelink communication system.

With respect to the above step 101, according to the example of the present disclosure, since a receiver address corresponding to the control information and a receiver address corresponding to the data are identical in the sidelink communication, it may configure the shared demodulation reference signal for the control information and the target data, so as to reduce an overhead of demodulation reference signal and improve a utilization rate of frequency spectrum.

With respect to the above step 102, any one of the following ways may be adopted to map the control information, the target data, and the demodulation reference signal onto the current time unit by using time-division multiplexing.

In the first way, the demodulation reference signal is not included in a time symbol on which the control information is located, and is mapped onto a first target time symbol of the time unit.

The step 102 may include the following step.

At step 102-11, the control information, the target data, and the demodulation reference signal are mapped onto different time symbols of the current time unit by using time-division multiplexing. The demodulation reference signal is mapped onto at least one first target time symbol of the time unit. The first target time symbol is located between a time symbol onto which the control information is mapped and a time symbol onto which the target data is mapped.

Figure 4A:
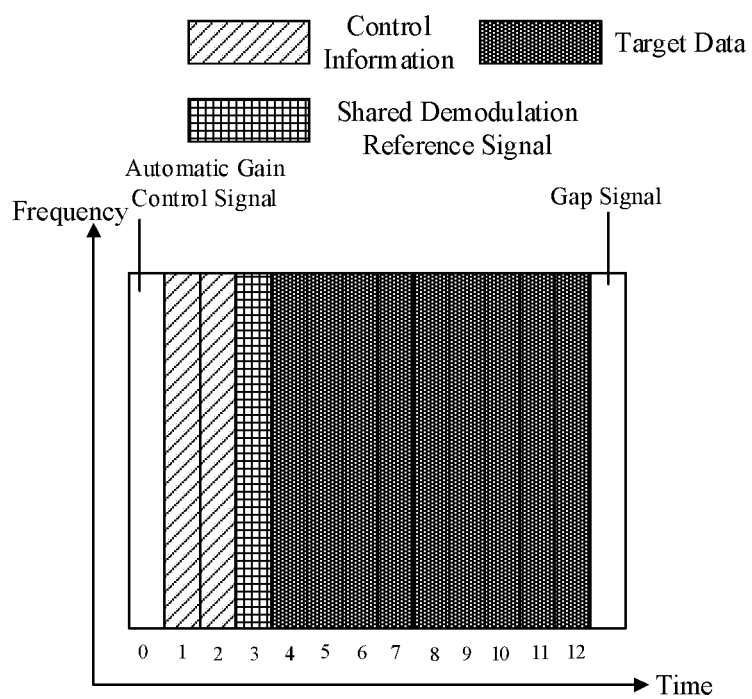
Figure 4B:
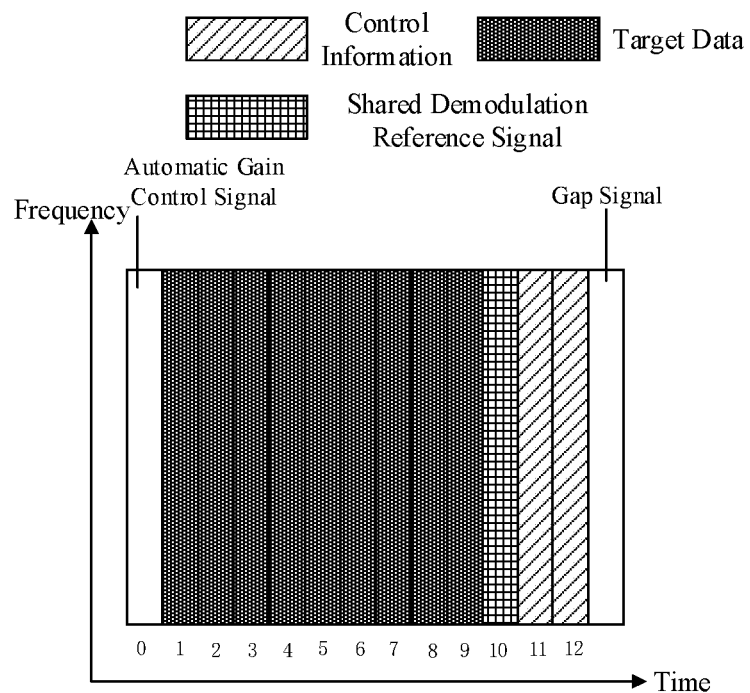

In this step, according to one or more embodiments, the control information, the target data, and the demodulation reference signal may be mapped as illustrated in FIG. 4A or FIG. 4B. In the examples of the present disclosure, the sequence of mapping the control information and mapping the target data is not limited.

In this way, it should be noted that frequency domain resources occupied by the control information overlap with a part of frequency domain resources occupied by the target data, or the frequency domain resources occupied by the control information overlap with all of the frequency domain resources occupied by the target data.

Figure 4C:
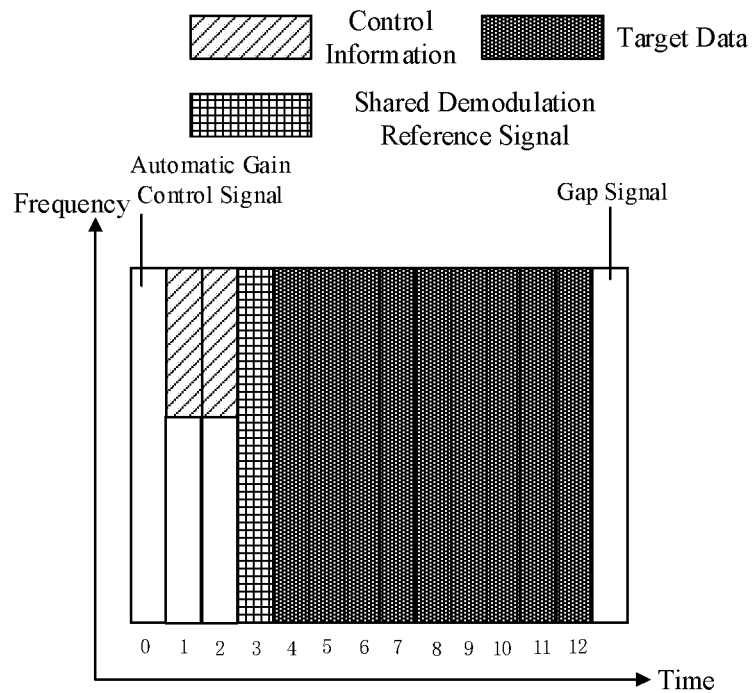

If the frequency domain resources occupied by the control information overlap with the part of the frequency domain resources occupied by the target data, it may be as illustrated in FIG. 4C or FIG. 4D. If the frequency domain resources occupied by the control information overlap with all of the frequency domain resources occupied by the target data, it may be as illustrated in FIG. 4A or FIG. 4B.

In the second way, the demodulation reference signal is included in a time symbol on which the control information is located, and the control information and the target data are mapped onto different time symbols of the time unit by using time-division multiplexing, and the demodulation reference signal is mapped onto at least one second target time symbol of the time unit.

The step 102 may include the following step.

At step 102-21, the control information and the target data are mapped onto different time symbols of the time unit by using time-division multiplexing.

Figure 6A:
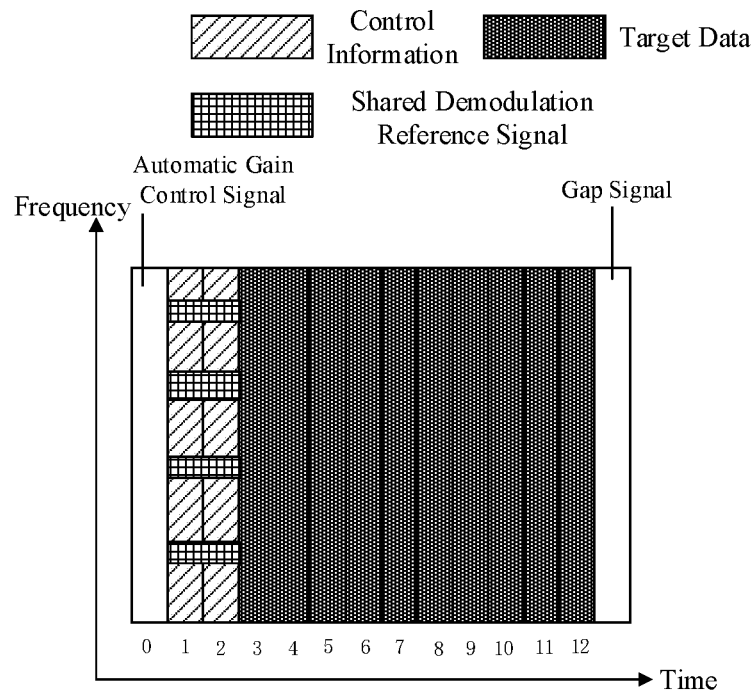
FIG. 6A to FIG. 6E are schematic diagrams illustrating sidelink-based transmission scenarios according to an example.
Figure 6B:
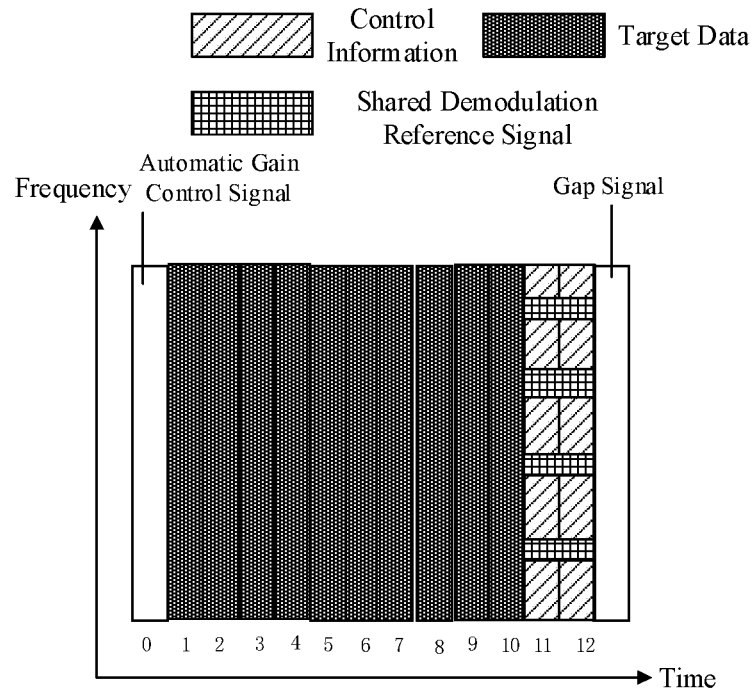

In this step, according to one or more embodiments, when the control information and the target data are mapped onto different time symbols, one time symbol onto which the control information is mapped may be adjacent to one time symbol onto which the target data is mapped, for example, as illustrated in FIG. 6A or FIG. 6B. The demodulation reference signal is included in the time symbol on which the control information is located.

In the examples of the present disclosure, the sequence of mapping the control information and mapping the target data is not limited.

In an example, referring to FIG. 5, which is a flowchart illustrating another sidelink-based transmission method according to the example illustrated in FIG. 3, besides the above-mentioned step 102-21, the step 102 may also include the following step.

At step 102-22, the demodulation reference signal is mapped onto at least one second target time symbol of the time unit. The second target time symbol is located between any two time symbols onto which the target data is mapped.

Figure 6C:
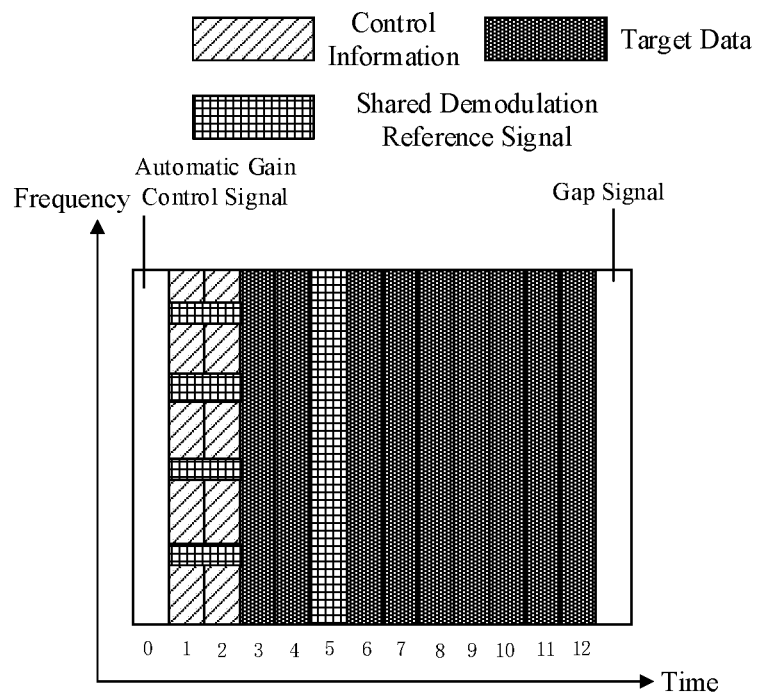
Figure 6D:
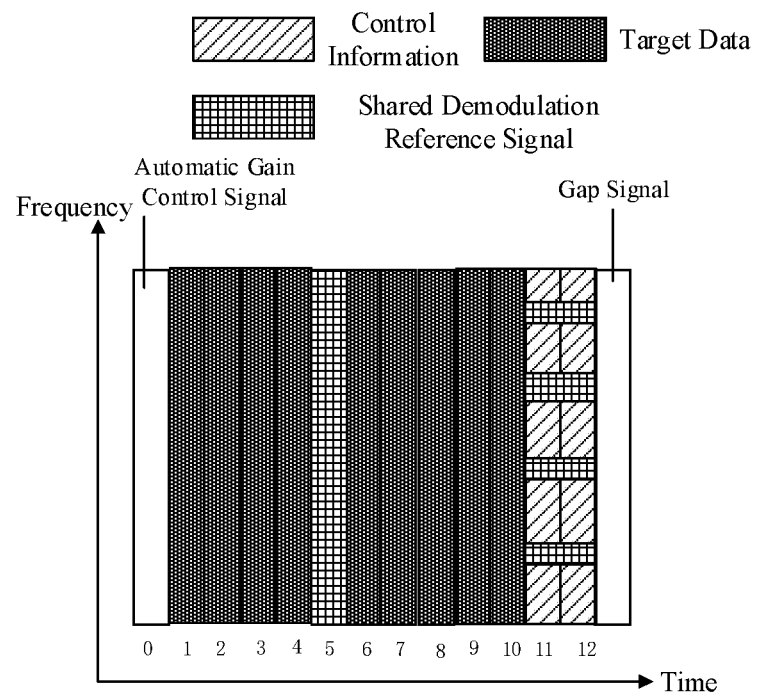

In one or more embodiments of the present disclosure, the case that there are relatively quick changes in channel's time domain, one second target time symbol may be inserted behind every 2-3 time symbols onto which the target data is mapped, and the demodulation reference signal is mapped onto the second target time symbol, for example, as illustrated in FIG. 6C or FIG. 6D.

In the case that there are relatively slow changes in channel's time domain, each second target time symbol may be inserted behind more time symbols onto which the target data is mapped, thereby reducing an overhead of demodulation reference signal.

In one or more embodiments as above, if the demodulation reference signal in the time symbol onto which the control information is mapped is enough to demodulate all of the target data in the time unit, the above step 102-22 may be omitted, that is, it is not necessary to map the demodulation reference signal onto the second target time symbol again, which saves the overhead of demodulation reference signal.

It should also be noted that, in this way, the frequency domain resources occupied by the control information overlap with a part of the frequency domain resources occupied by the target data, or the frequency domain resources occupied by the control information overlap with all of the frequency domain resources occupied by the target data.

Figure 6E:
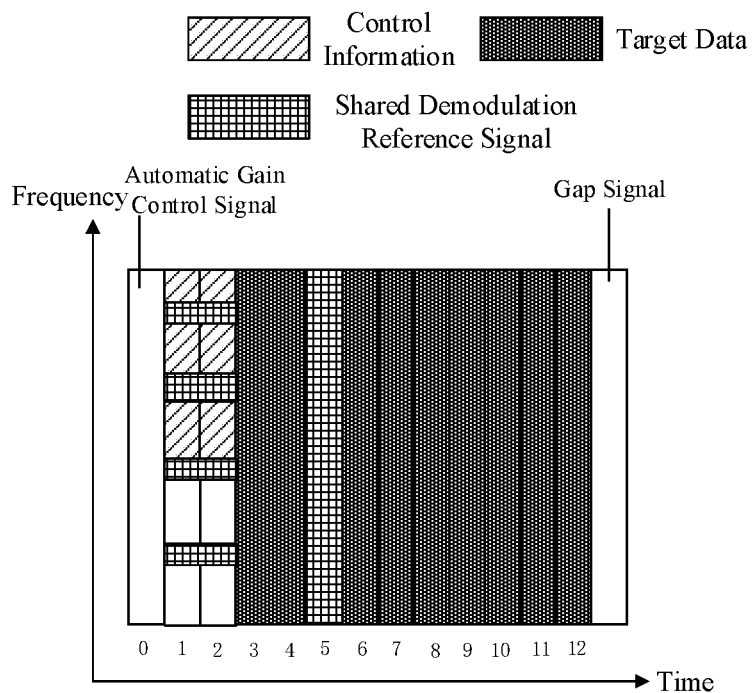

If the frequency domain resources occupied by the control information overlap with the part of the frequency domain resources occupied by the target data, it may be as illustrated in FIG. 6E. If the frequency domain resources occupied by the control information overlap with all of the frequency domain resources occupied by the target data, it may be as illustrated in FIG. 6C or FIG. 6D.

In the third way, the demodulation reference signal is not included in a time symbol on which the control information is located and is mapped onto a third target time symbol of the time unit, the control information is mapped onto a fourth target time symbol before the third target time symbol and onto a fifth target time symbol behind the third target time symbol, and the target data is mapped onto at least one sixth target time symbol that is located behind the fifth target time symbol and/or before the fourth target time symbol.

Figure 7:
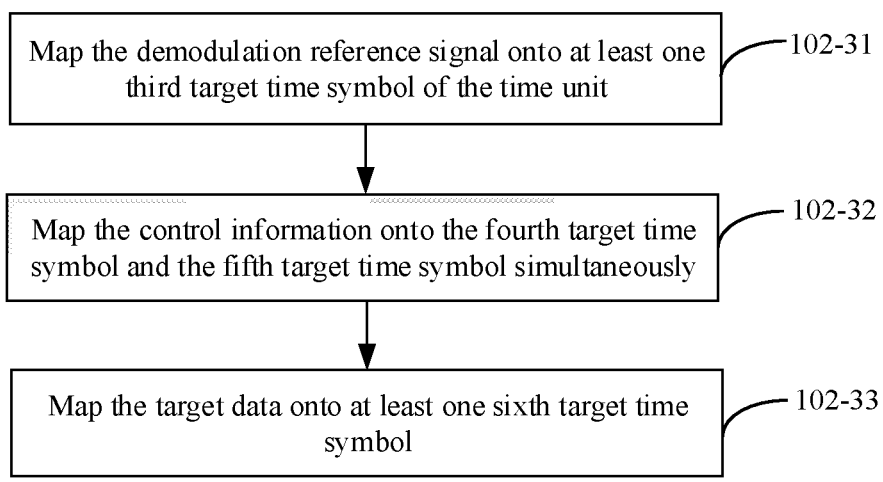
FIG. 7 is a flowchart illustrating another sidelink-based transmission method according to an example.

Referring to FIG. 7, which is a flowchart illustrating another sidelink-based transmission method according to the example illustrated in FIG. 3, the step 102 may include the following steps.

At step 102-31, the demodulation reference signal is mapped onto at least one third target time symbol of the time unit.

Figure 8A:
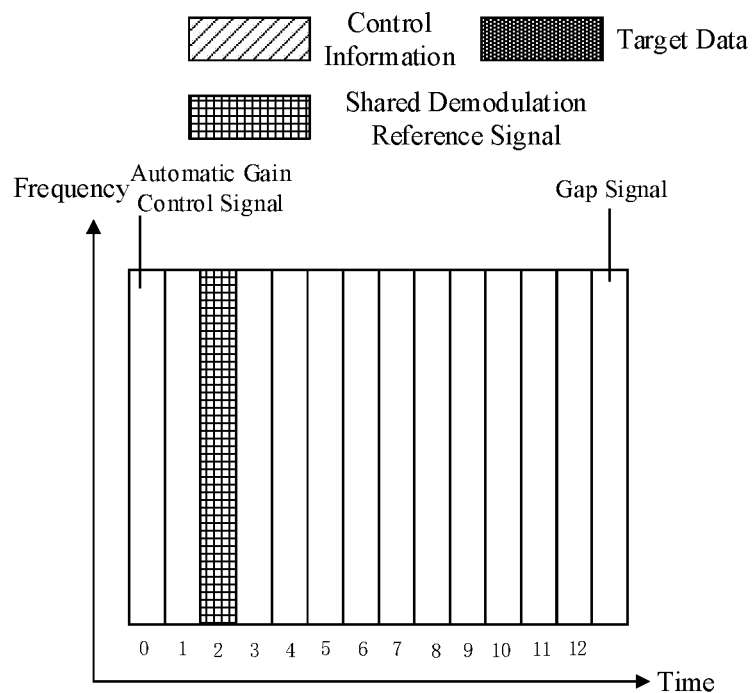
FIG. 8A to FIG. 8E are schematic diagrams illustrating sidelink-based transmission scenarios according to an example.

In this step, the demodulation reference signal is firstly mapped onto time symbol 2 of the time unit, for example, as illustrated in FIG. 8A.

At step 102-32, the control information is mapped onto the fourth target time symbol and the fifth target time symbol simultaneously.

Figure 8B:
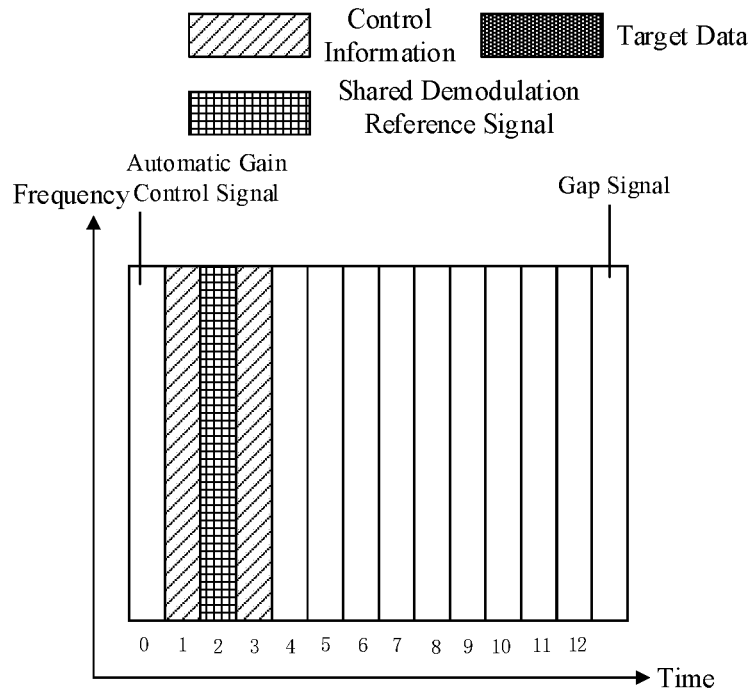

In this step, the control information may be mapped onto the fourth target time symbol which is before the third target time symbol and onto the fifth target time symbol which is behind the third target time symbol, for example, onto time symbol 1 and time symbol 3 illustrated in FIG. 8B.

At step 102-33, the target data is mapped onto at least one sixth target time symbol.

Figure 8C:
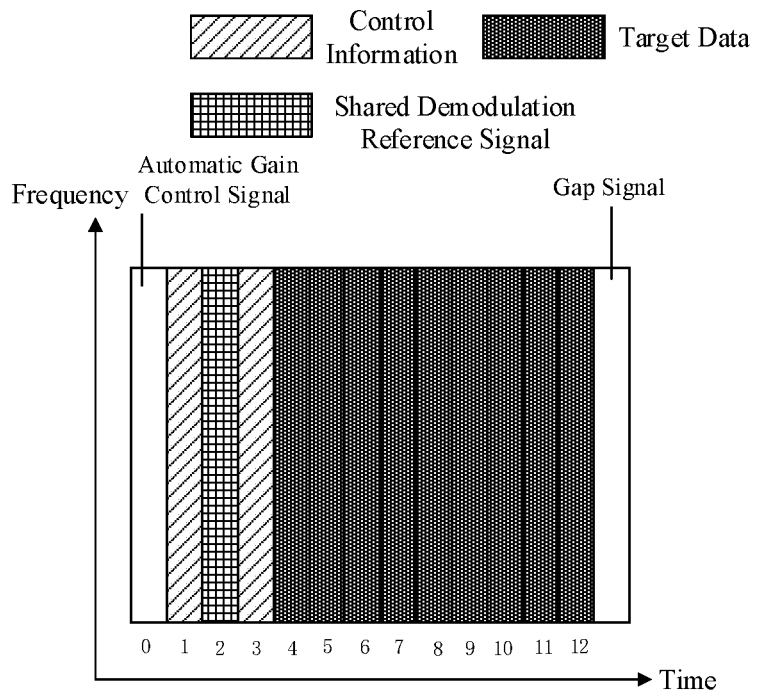
Figure 8D:
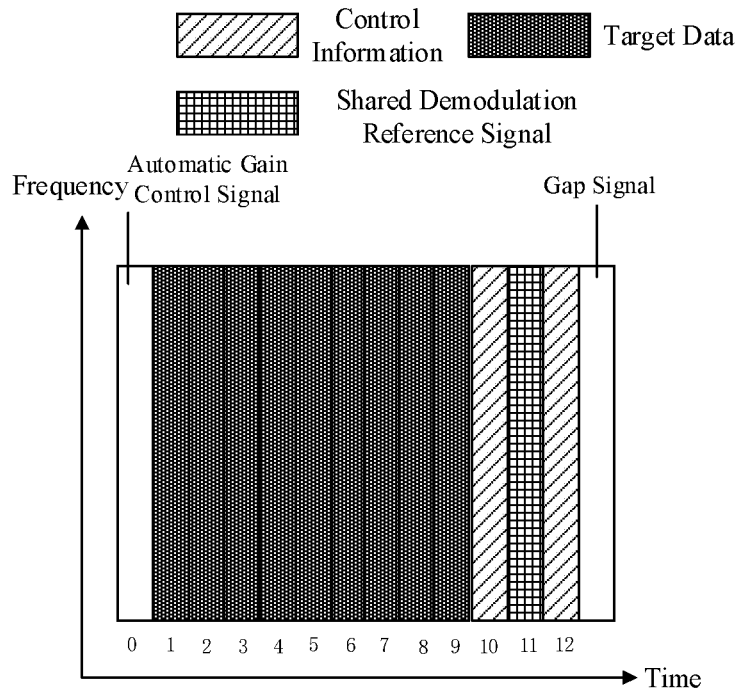

In this step, the transmitter may further map the target data onto at least one sixth target time symbol which is located behind the fifth target time symbol, for example, as illustrated in FIG. 8C, or map the target data onto at least one sixth target time symbol which is located before the fourth target time symbol, for example, as illustrated in FIG. 8D.

Of course, in one or more embodiments, the transmitter may map the target data onto at least one sixth target time symbol which is located behind the fifth target time symbol and before the fourth target time symbol.

Similarly, in this way, the frequency domain resources occupied by the control information overlap with a part of the frequency domain resources occupied by the target data, or the frequency domain resources occupied by the control information overlap with all of the frequency domain resources occupied by the target data.

Figure 8E:
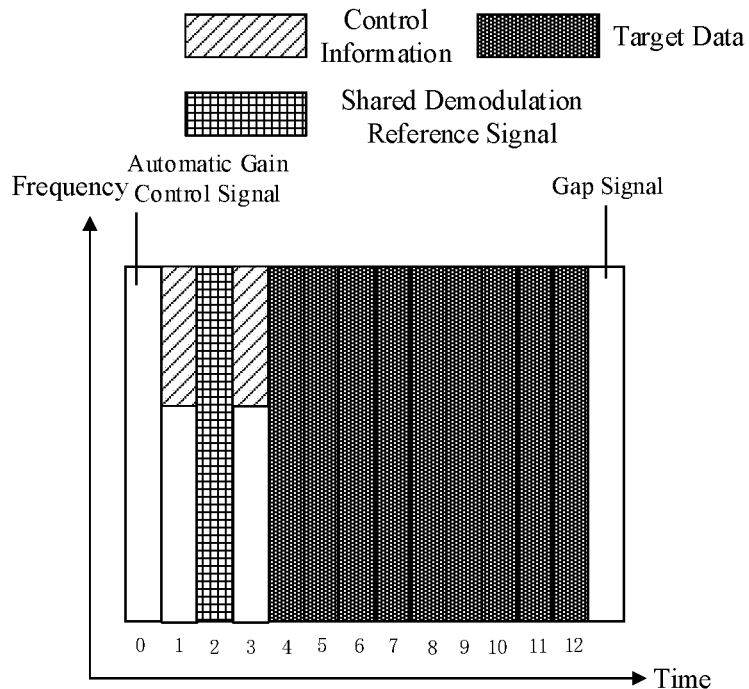

If the frequency domain resources occupied by the control information overlap with the part of the frequency domain resources occupied by the target data, it may be as illustrated in FIG. 8E. If the frequency domain resources occupied by the control information overlap with all of the frequency domain resources occupied by the target data, it may be as illustrated in FIG. 8C or FIG. 8D.

Through each of the above three ways, it can succeed in mapping the control information, the target data, and the demodulation reference signal onto the current time unit by using time-division multiplexing, and thus the transmitter may perform the mapping in any one way.

With respect to the above step 103, the transmitter may adopt a same precoding matrix and a same transmitting beam directly according to the related technology to transmit the control information, the target data, and the demodulation reference signal to the receiver through the time unit.

Figure 9:
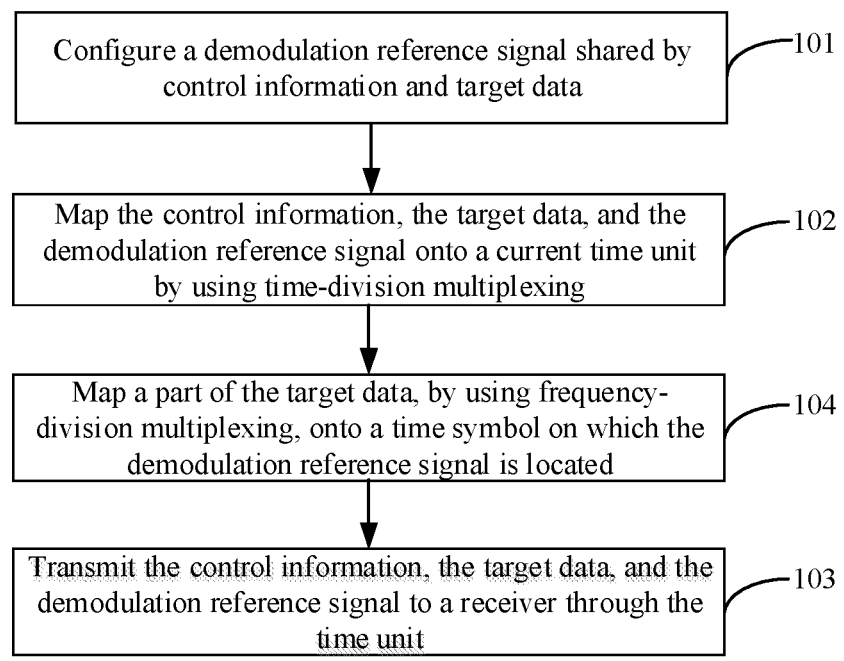
FIG. 9 is a flowchart illustrating another sidelink-based transmission method according to an example.

In an example, it is not necessary to use all of resource elements of the time symbol onto which the demodulation reference signal is mapped to carry the demodulation reference signal. In one or more embodiments, refer to FIG. 9, which is a flowchart illustrating another sidelink-based transmission method on the basis of the example illustrated in FIG. 3, before the step 103 is performed, the above method may further include the following step.

At step 104, a part of the target data is mapped, by using frequency-division multiplexing, onto a time symbol on which the demodulation reference signal is located.

Figure 10:
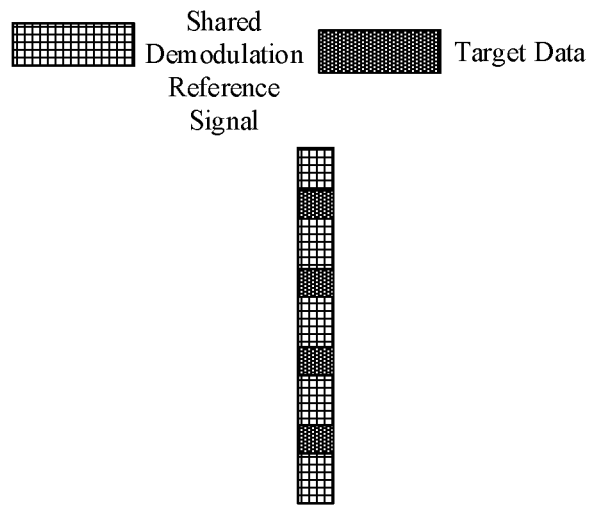
FIG. 10 is a schematic diagram illustrating a sidelink-based transmission scenario according to an example.

In this step, a part of the resource elements in the time symbol onto which the demodulation reference signal is mapped may be allocated to the target data for carrying the part of the target data, for example, as illustrated in FIG. 10.

In the above example, the transmitter may use frequency-division multiplexing to map the part of the target data onto the time symbol on which the demodulation reference signal is located, thereby saving transmission resources. Through the above processes, the control information, the target data, and the demodulation reference signal may be transmitted in the sidelink communication by using time-division multiplexing and frequency-division multiplexing simultaneously, which further meets respective requirements of different V2X services.

Figure 11:
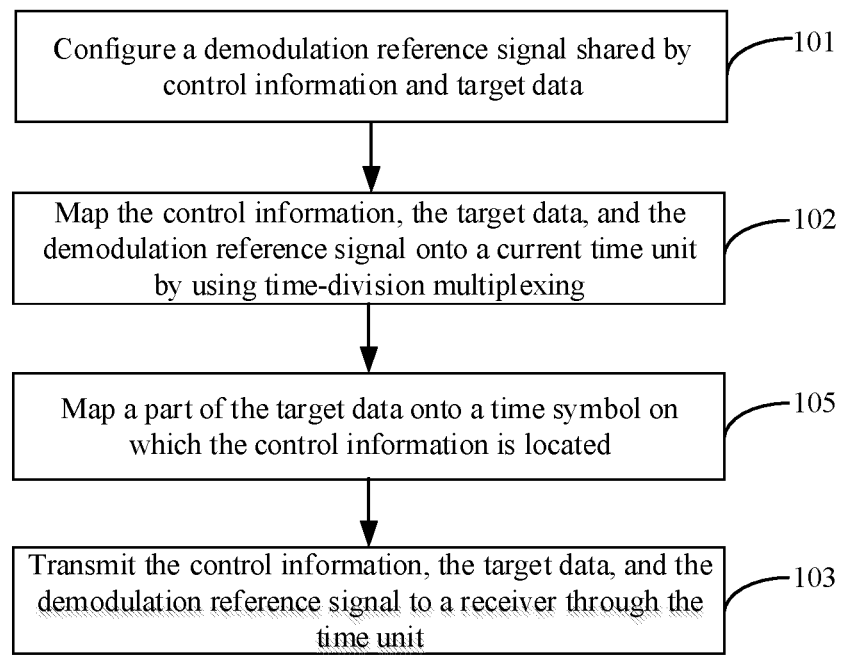
FIG. 11 is a flowchart illustrating another sidelink-based transmission method according to an example.

In an example, the frequency domain resources occupied by the control information overlap with at least a part of the frequency domain resources occupied by the target data. If the frequency domain resources occupied by the control information overlap with the part of the frequency domain resources occupied by the target data, some resource elements in the time symbol onto which the control information is mapped are idle. In an example of the present disclosure, referring to FIG. 11, which is a flowchart illustrating another sidelink-based transmission method on the basis of the example illustrated in FIG. 3. before step 103 is performed, the above method may further include the following step.

At step 105, a part of the target data is mapped onto a time symbol on which the control information is located.

Figure 12A:
FIG. 12A to FIG. 12B are schematic diagrams illustrating sidelink-based transmission scenarios according to an example.
Figure 12B:

In this step, the idle resource elements in the time symbol on which the control information is located may be allocated to the target data for carrying the part of the target data, for example, as illustrated in FIG. 12A. If the demodulation reference signal is included in the time symbol on which the control information is located, the part of the target data may be mapped onto idle resource elements, for example, as illustrated in FIG. 12B.

In the above example, when the time-division multiplexing is used, the frequency domain resources occupied by the control information overlap with at least the part of the frequency domain resources occupied by the target data. In one or more embodiments, in the case that the frequency domain resources occupied by the control information overlap with the part of the frequency domain resources occupied by the target data, the transmitter may also map a part of the target data onto the time symbol on which the control information is located. Similarly, the control information, the target data, and the demodulation reference signal may be transmitted in the sidelink communication by using time-division multiplexing and frequency-division multiplexing simultaneously, which further meets respective requirements of different V2X services.

Next, the sidelink-based transmission method provided by the examples of the present disclosure is explained from a side of a receiver.

Figure 13:
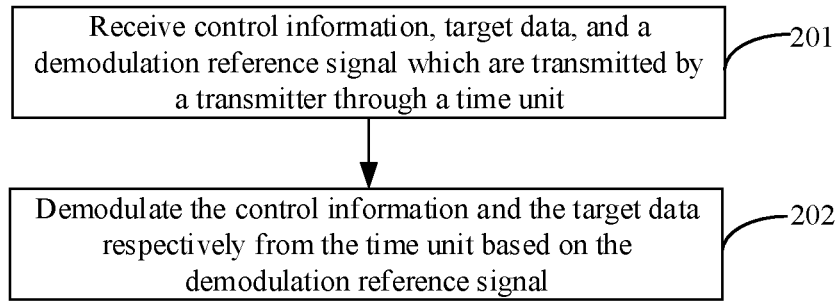
FIG. 13 is a flowchart illustrating another sidelink-based transmission method according to an example.

An example of the present disclosure provides another sidelink-based transmission method, which is applicable to the receiver in a V2X network. Referring to FIG. 13, which is a flowchart illustrating another sidelink-based transmission method according to the example, the following steps may be included.

At step 201, control information, target data, and a demodulation reference signal, which are transmitted by a transmitter through a time unit, are received.

The target data is associated with the control information, the demodulation reference signal is shared by the control information and the target data, and the control information, the target data, and the demodulation reference signal are mapped onto the time unit by using time-division multiplexing.

At step 202, the control information and the target data are demodulated respectively from the time unit based on the demodulation reference signal.

In the above example, it succeeds in transmitting the control information, the target data, and the demodulation reference signal on the basis of time-division multiplexing in a sidelink communication system.

With respect to the above step 201, the receiver may directly receive the control information, the target data, and the demodulation reference signal, which are transmitted by the transmitter through the time unit.

With respect to the above step 202, corresponding to different time-division multiplexing ways used by the transmitter, the receiver may adopt different approaches to demodulate the control information and the target data respectively from the time unit based on the demodulation reference signal.

Figure 14:
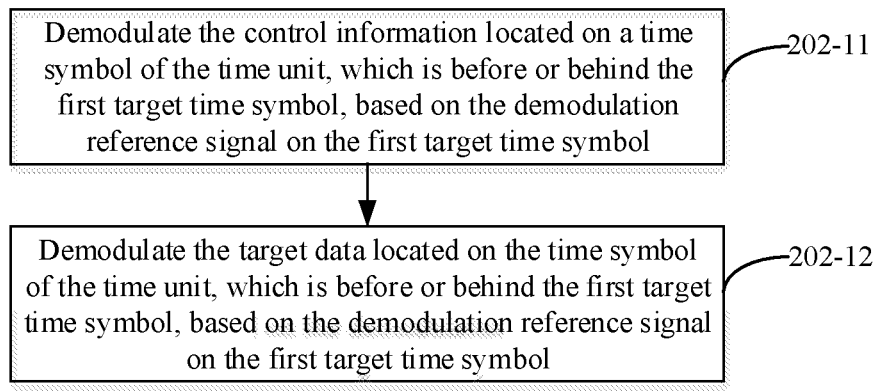
FIG. 14 is a flowchart illustrating another sidelink-based transmission method according to an example.

For the first approach, the demodulation reference signal is not included in a time symbol onto which the control information is mapped, but is mapped onto a first target time symbol of the time unit. In one or more embodiments, referring to FIG. 14, which is a flowchart illustrating another sidelink-based transmission method on the basis of the example illustrated in FIG. 13, the step 202 may include the following steps.

At step 202-11, the control information located on a time symbol of the time unit, which is before or behind the first target time symbol, is demodulated based on the demodulation reference signal on the first target time symbol.

In one or more embodiments of the present disclosure, the transmitter maps the control information, the target data, and the demodulation reference signal onto the time unit in the first way, as illustrated in FIG. 4A.

In this step, the receiver may directly demodulate the control information on time symbol 1 and time symbol 2 based on the demodulation reference signal on time symbol 3 according to the prior art.

Or, the receiver may directly demodulate the control information on time symbol 11 and time symbol 12 based on the demodulation reference signal on time symbol 10 in FIG. 4B.

At step 202-12, the target data located on the time symbol of the time unit, which is before or behind the first target time symbol, is demodulated based on the demodulation reference signal on the first target time symbol.

In this step, the receiver may directly demodulate the target data on time symbols 4-12 based on the demodulation reference signal on time symbol 3 in FIG. 4A according to the prior art.

Or, the receiver may directly demodulate the target data on time symbols 1-9 based on the demodulation reference signal on time symbol 10 in FIG. 4B.

Figure 15:
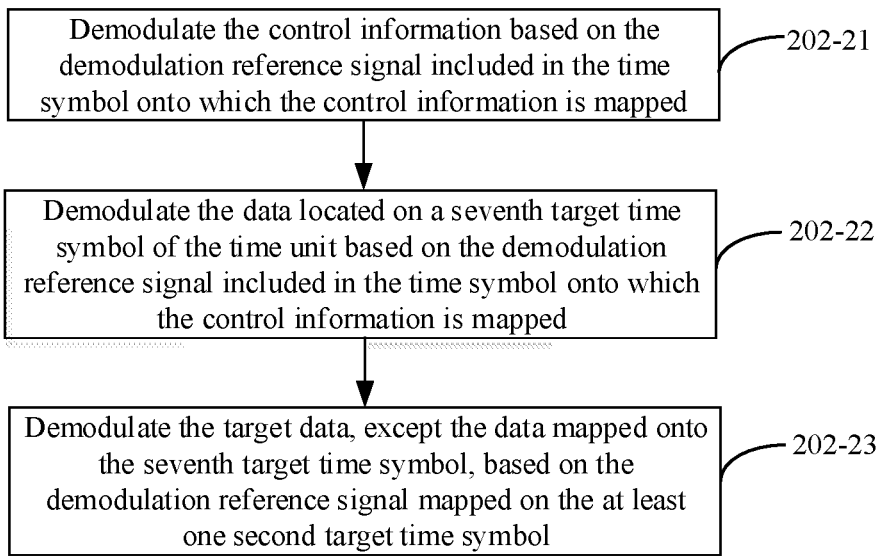
FIG. 15 is a flowchart illustrating another sidelink-based transmission method according to an example.

For the second approach, the demodulation reference signal is included in a time symbol onto which the control information is mapped, and is further mapped onto at least one second target time symbol of the time unit. In one or more embodiments, referring to FIG. 15, which is a flowchart illustrating another sidelink-based transmission method on the basis of the example illustrated in FIG. 13, the step 202 may include the following steps.

At step 202-21, the control information is demodulated based on the demodulation reference signal included in the time symbol onto which the control information is mapped.

In this step, the receiver may demodulate the control information based on the demodulation reference signal on which the control information is located according to the prior art. That is, the receiver demodulate the control information on time symbol 1 and time symbol 2 based on the demodulation reference signal on time symbol 1 and time symbol 2 in FIG. 6A.

Or, the receiver may demodulate the control information on time symbol 11 and time symbol 12 based on the demodulation reference signal on time symbol 11 and time symbol 12 in FIG. 6B.

At step 202-22, the data located on a seventh target time symbol of the time unit is demodulated based on the demodulation reference signal included in the time symbol onto which the control information is mapped. The seventh target time symbol is located between a time symbol onto which the control information is mapped and the first one of the second target time symbol.

In one or more embodiments of the present disclosure, the transmitter further maps the demodulation reference signal onto at least one second target time symbol of the time unit. Accordingly, in this step, the receiver may demodulate the data on time symbol 3 and time symbol 4 based on the demodulation reference signals on time symbol 1 and time symbol 2 in FIG. 6C.

Or, the receiver may demodulate the data on time symbols 6-10 based on the demodulation reference signal on time symbol 11 and time symbol 12 in FIG. 6D.

At step 202-23, the target data, except the data mapped onto the seventh target time symbol, is demodulated based on the demodulation reference signal mapped on at least one second target time symbol.

In this step, the receiver demodulates the data on time symbols 6-12 based on the demodulation reference signal on time symbol 5 in FIG. 6C.

Or, the receiver demodulates the data on time symbols 1-4 based on the demodulation reference signal on time symbol 5 in FIG. 6D.

In one or more embodiments of the present disclosure, if the demodulation reference signal is only mapped onto the time symbol on which the control information is located, the above steps 202-22 and 202-23 may be simplified to directly demodulate all of the target data based on the demodulation reference signal according to the related art.

Figure 16:
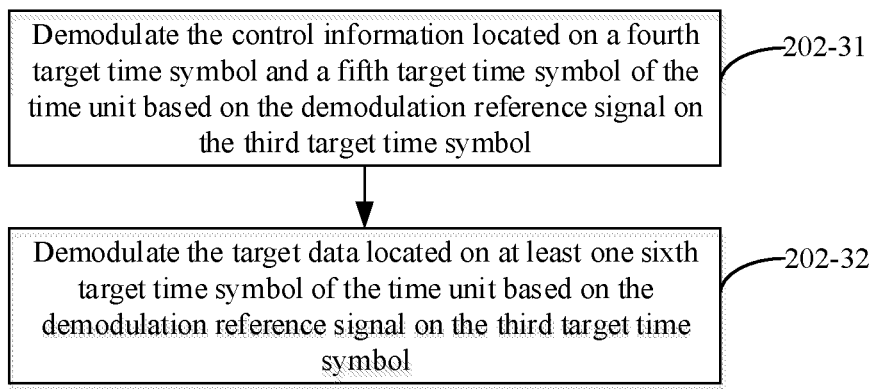
FIG. 16 is a flowchart illustrating another sidelink-based transmission method according to an example.

For the third approach, the demodulation reference signal is not included in a time symbol on which the control information is located, and is mapped onto a third target time symbol of the time unit. In one or more embodiments, referring to FIG. 16, which is a flowchart illustrating another sidelink-based transmission method on the basis of the example illustrated in FIG. 13, the step 202 may include the following steps.

At step 202-31, the control information located on a fourth target time symbol and a fifth target time symbol of the time unit is demodulated based on the demodulation reference signal on the third target time symbol.

In this step, the receiver may demodulate the control information on time symbol 1 or time symbol 3 based on the demodulation reference signal on time symbol 2 in FIG. 8C according to the prior art.

Or, the receiver may demodulate the control information on time symbol 10 and time symbol 12 based on the demodulation reference signal on time symbol 11 in FIG. 8D.

At step 202-32, the target data located on at least one sixth target time symbol of the time unit is demodulated based on the demodulation reference signal on the third target time symbol.

In this step, the receiver may demodulate the target data on time symbols 4-12 based on the demodulation reference signal on time symbol 2 in FIG. 8C according to the prior art.

Or, the receiver may demodulate the target data on time symbols 1-9 based on the demodulation reference signal on time symbol 11 in FIG. 8D according to the prior art.

In one embodiment, if the transmitter also uses frequency-division multiplexing to map a part of the target data onto the time symbol on which the demodulation reference signal is located, the receiver may demodulate the part of the target data mapped onto the time symbol on which the demodulation reference signal is located by utilizing the demodulation reference signal.

In one embodiment, if the transmitter also uses frequency-division multiplexing to map a part of the target data onto the time symbol on which the control information is located, the receiver may accordingly demodulate the part of the target data mapped on the time symbol on which the control information is located by utilizing the demodulation reference signal in the above-mentioned approach.

In the above examples, when both time-division multiplexing and frequency-division multiplexing are used by the transmitter, the receiver can correctly demodulate the control information and the target data from the time unit through the shared demodulation reference signal, thereby further meeting respective requirements of different V2X services.

Figure 17:
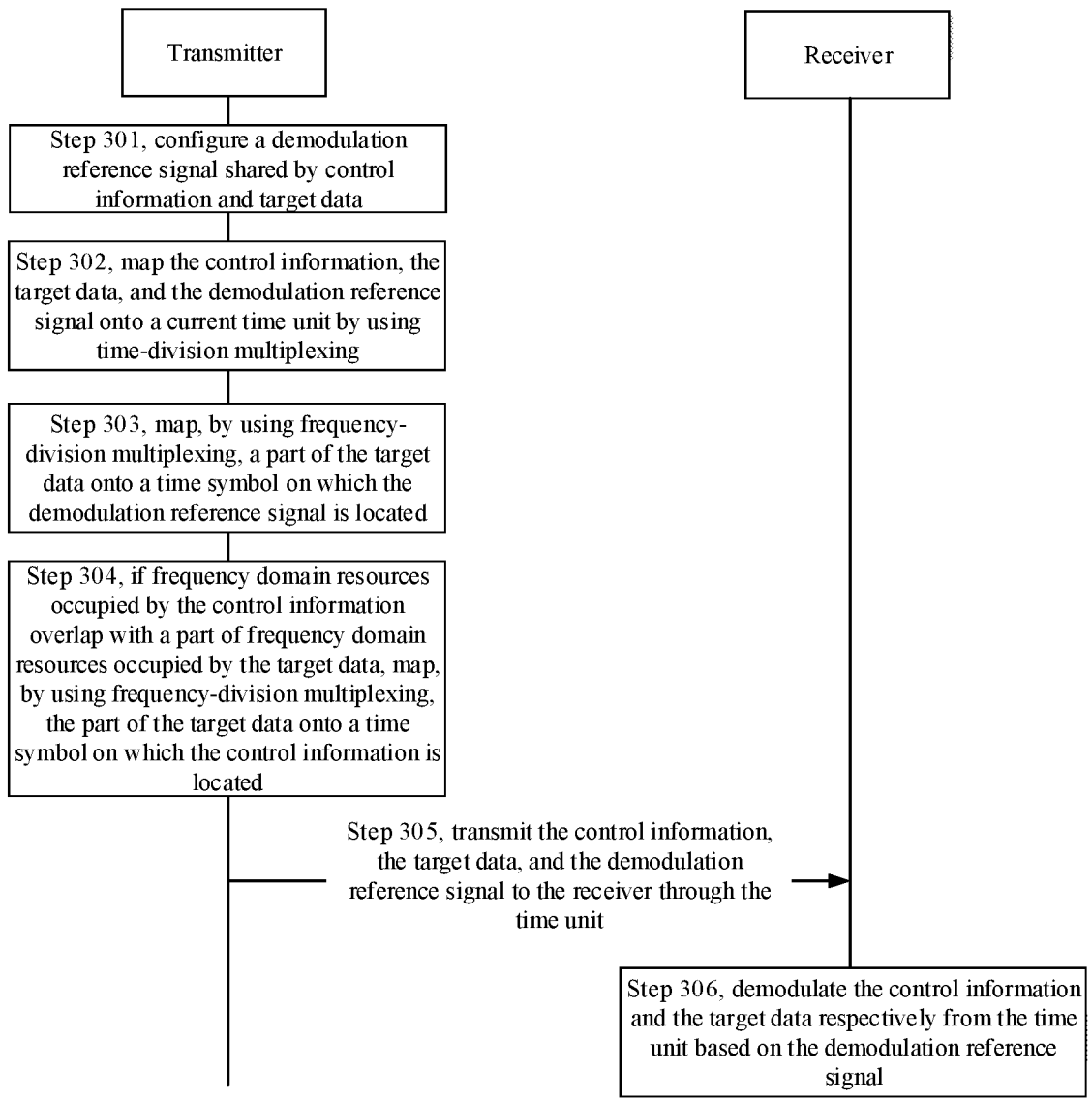
FIG. 17 is a flowchart illustrating another sidelink-based transmission method according to an example.

In one example, referring to FIG. 17, which is a flowchart illustrating another sidelink-based transmission method according to the example, the following steps may be included.

At step 301, a transmitter configures a demodulation reference signal shared by control information and target data.

The target data indicates to-be-transmitted data associated with the control information.

At step 302, the transmitter maps the control information, the target data, and the demodulation reference signal onto a current time unit by using time-division multiplexing.

In one or more embodiments, the transmitter may map the control information, the target data, and the demodulation reference signal onto the current time unit in any one of the above-mentioned time-division multiplexing ways.

At step 303, the transmitter maps, by using frequency-division multiplexing, a part of the target data onto a time symbol on which the demodulation reference signal is located.

At step 304, if frequency domain resources occupied by the control information overlap with a part of frequency domain resources occupied by the target data, the transmitter maps, by using frequency-division multiplexing, the part of the target data onto a time symbol on which the control information is located.

At step 305, the transmitter transmits the control information, the target data, and the demodulation reference signal to a receiver through the time unit.

At step 306, the receiver demodulates the control information and the target data respectively from the time unit based on the demodulation reference signal.

In the above example, the transmitter may configure a shared demodulation reference signal for to-be-transmitted control information and to-be-transmitted target data, thereby reducing an overhead on demodulation reference signal and improving a utilization rate of frequency spectrum. In addition, the transmitter may combine time-division multiplexing and frequency-division multiplexing to map the control information, the target data, and the demodulation reference signal onto a current time unit, and transmit the control information, the target data, and the demodulation reference signal to the receiver through the current time unit, which has high availability.

Corresponding to the foregoing method examples implementing the application functions, the present disclosure also provides apparatuses examples for implementing the application functions, and provides corresponding transmitter examples and corresponding receiver examples.

Figure 18:
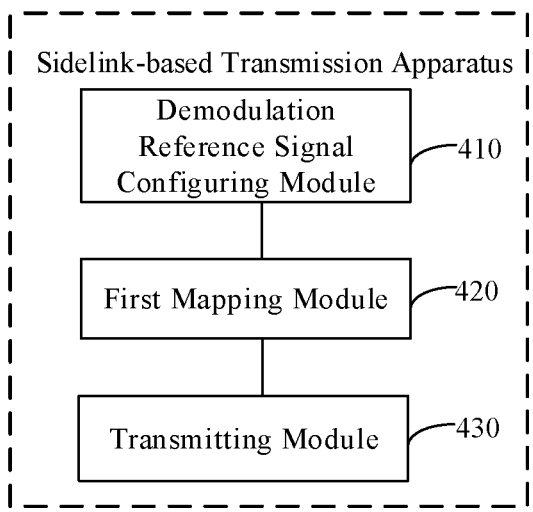
FIG. 18 is a block diagram illustrating a sidelink-based transmission apparatus according to an example.

Referring to FIG. 18, which is a block diagram illustrating a sidelink-based transmission apparatus according to an example, the apparatus is applicable to a transmitter and includes:
- a demodulation reference signal configuring module 410 that is configured to configure a demodulation reference signal shared by control information and target data, where the target data indicates to-be-transmitted data associated with the control information;
- a first mapping module 420 that is configured to map the control information, the target data, and the demodulation reference signal onto a current time unit by using time-division multiplexing; and
- a transmitting module 430 that is configured to transmit the control information, the target data, and the demodulation reference signal to a receiver through the time unit.

In one or more embodiments, the demodulation reference signal is not included in a time symbol on which the control information is located.

Figure 19:
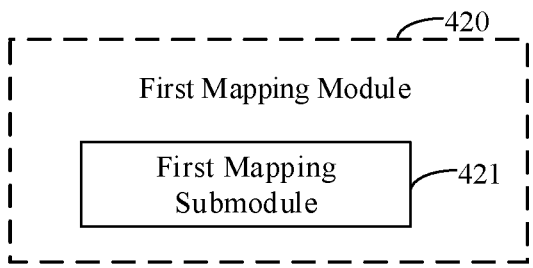
FIG. 19 is a block diagram illustrating another sidelink-based transmission apparatus according to an example.

Referring to FIG. 19, which is a block diagram illustrating another sidelink-based transmission apparatus on the basis of the example illustrated in FIG. 18, the first mapping module 420 includes:
- a first mapping submodule 421 that is configured to map the control information, the target data, and the demodulation reference signal onto different time symbols of the current time unit by using time-division multiplexing, where the demodulation reference signal is mapped onto at least one first target time symbol of the time unit, and where the first target time symbol is located between a time symbol onto which the control information is mapped and a time symbol onto which the target data is mapped.

In one or more embodiments, the demodulation reference signal is included in a time symbol on which the control information is located.

Figure 20A:
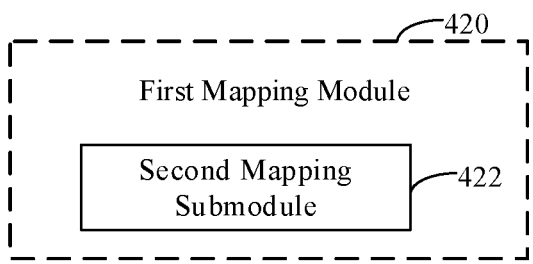
FIG. 20A to FIG. 20B are block diagrams illustrating sidelink-based transmission apparatuses according to an example.

Referring to FIG. 20A, which is a block diagram illustrating another sidelink-based transmission apparatus on the basis of the example illustrated in FIG. 18, the first mapping module 420 includes:
- a second mapping submodule 422 that is configured to map the control information and the target data onto different time symbols of the time unit by using time-division multiplexing.

Figure 20B:
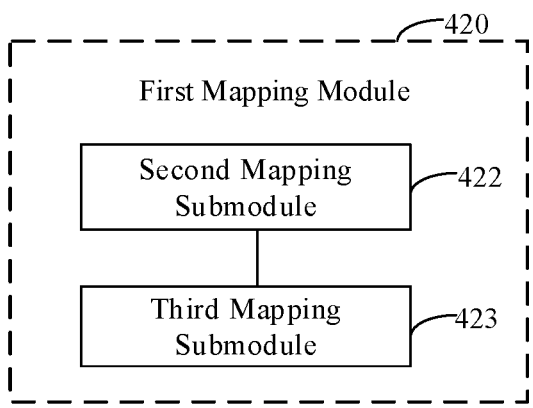

Referring to FIG. 20B, which is a block diagram illustrating another sidelink-based transmission apparatus on the basis of the example illustrated in FIG. 20A, the first mapping module 420 further includes:
- a third mapping submodule 423 that is configured to map the demodulation reference signal onto at least one second target time symbol of the time unit, where the second target time symbol is located between any two time symbols onto which the target data is mapped.

In one or more embodiments, the demodulation reference signal is not included in a time symbol on which the control information is located.

Figure 21:
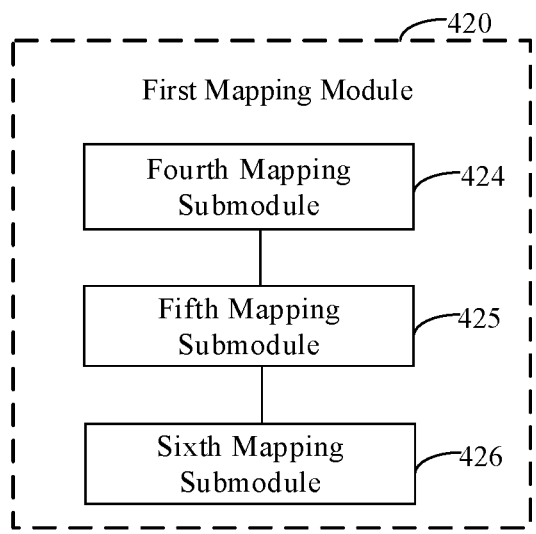
FIG. 21 is a block diagram illustrating another sidelink-based transmission apparatus according to an example.

Referring to FIG. 21, which is a block diagram illustrating another sidelink-based transmission apparatus on the basis of the example illustrated in FIG. 18, the first mapping module 420 includes:
- a fourth mapping submodule 424 that is configured to map the demodulation reference signal onto at least one third target time symbol of the time unit;
- a fifth mapping submodule 425 that is configured to map the control information onto a fourth target time symbol and a fifth target time symbol simultaneously, where the fourth target time symbol is located in the time unit and before the third target time symbol, and the fifth target time symbol is located in the time unit and behind the third target time symbol; and
- a sixth mapping submodule 426 that is configured to map the target data onto at least one sixth target time symbol, where the sixth target time symbol is located behind the fifth target time symbol and/or before the fourth target time symbol.

Figure 22:
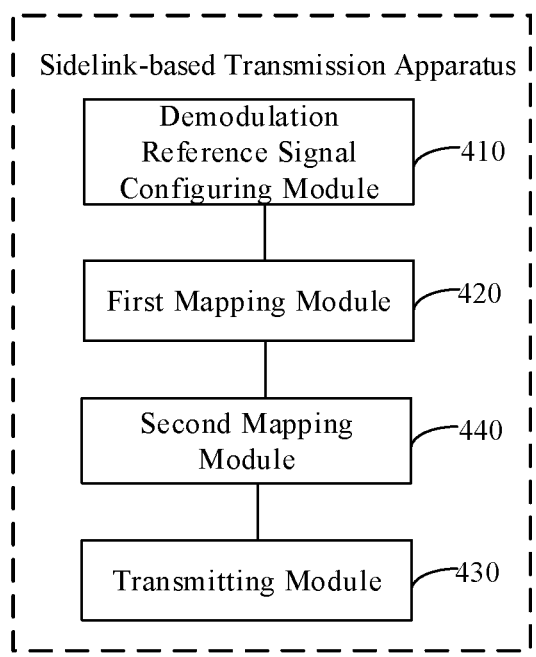
FIG. 22 is a block diagram illustrating another sidelink-based transmission apparatus according to an example.

Referring to FIG. 22, which is a block diagram illustrating another sidelink-based transmission apparatus on the basis of the example illustrated in FIG. 18, the apparatus further includes:
- a second mapping module 440 that is configured to map, by using frequency-division multiplexing, a part of the target data onto a time symbol on which the demodulation reference signal is located.

In one or more embodiments, frequency domain resources occupied by the control information overlap with a part of frequency domain resources occupied by the target data; or the frequency domain resources occupied by the control information overlap with all of the frequency domain resources occupied by the target data.

Figure 23:
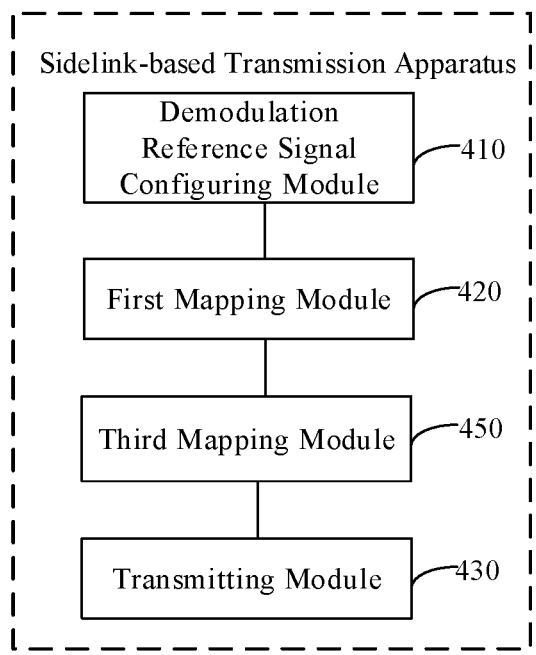
FIG. 23 is a block diagram illustrating another sidelink-based transmission apparatus according to an example.

Referring to FIG. 23, which is a block diagram illustrating another sidelink-based transmission apparatus on the basis of the example illustrated in FIG. 18, the apparatus further includes:
- a third mapping module 450 that is configured to map, by using frequency-division multiplexing, a part of the target data onto the time symbol on which the control information is located if the frequency domain resources occupied by the control information overlap with a part of the frequency domain resources occupied by the target data.

Figure 24:
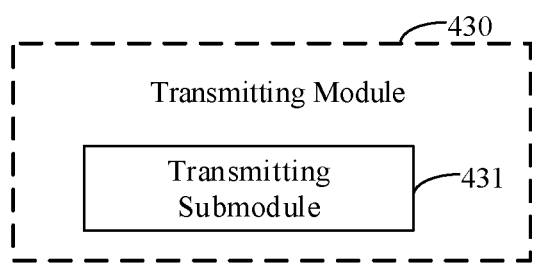
FIG. 24 is a block diagram illustrating another sidelink-based transmission apparatus according to an example.

Referring to FIG. 24, which is a block diagram illustrating another sidelink-based transmission apparatus on the basis of the example illustrated in FIG. 18, the transmitting module 430 includes:
- a transmitting submodule 431 that is configured to transmit, by adopting a same precoding matrix and a same transmitting beam, the control information, the target data, and the demodulation reference signal to the receiver through the time unit.

Figure 25:
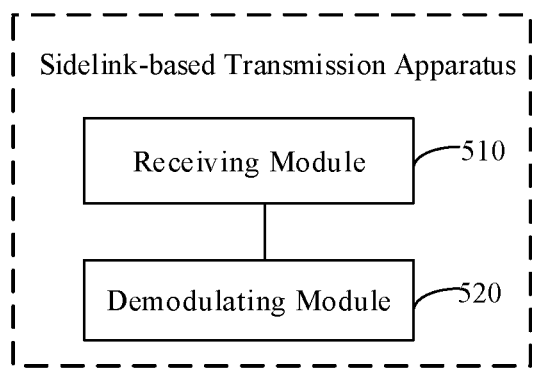
FIG. 25 is a block diagram illustrating another sidelink-based transmission apparatus according to an example.

Referring to FIG. 25, which is a block diagram illustrating a sidelink-based transmission apparatus according to an example, the apparatus is applicable to a receiver and includes:
- a receiving module 510 that is configured to receive control information, target data, and a demodulation reference signal which are transmitted by a transmitter through a time unit, where the target data is associated with the control information, the demodulation reference signal is shared by the control information and the target data, and the control information, the target data, and the demodulation reference signal are mapped onto the time unit by using time-division multiplexing; and
- a demodulating module 520 that is configured to demodulate the control information and the target data respectively from the time unit based on the demodulation reference signal.

For the apparatus examples, since they basically correspond to the method examples, reference may be made to the partial description of the method examples. The apparatus examples described above are merely illustrative, in which the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement without creative work.

Correspondingly, the present disclosure also provides a computer-readable storage medium storing a computer program. The computer program is configured to execute any one of the sidelink-based transmission methods applicable to a transmitter described above.

Correspondingly, the present disclosure also provides a computer-readable storage medium storing a computer program. The computer program is configured to execute any one of the sidelink-based transmission methods applicable to a receiver described above.

Correspondingly, the present disclosure also provides a sidelink-based transmission apparatus, which is applicable to a transmitter and includes:
- a processor; and
- a memory, configured to store instructions executable by the processor;
- where the processor is configured to:
- configure a demodulation reference signal shared by control information and target data, where the target data indicates to-be-transmitted data associated with the control information;
- map the control information, the target data, and the demodulation reference signal onto a current time unit by using time-division multiplexing; and
- transmit the control information, the target data, and the demodulation reference signal to a receiver through the time unit.

Figure 26:
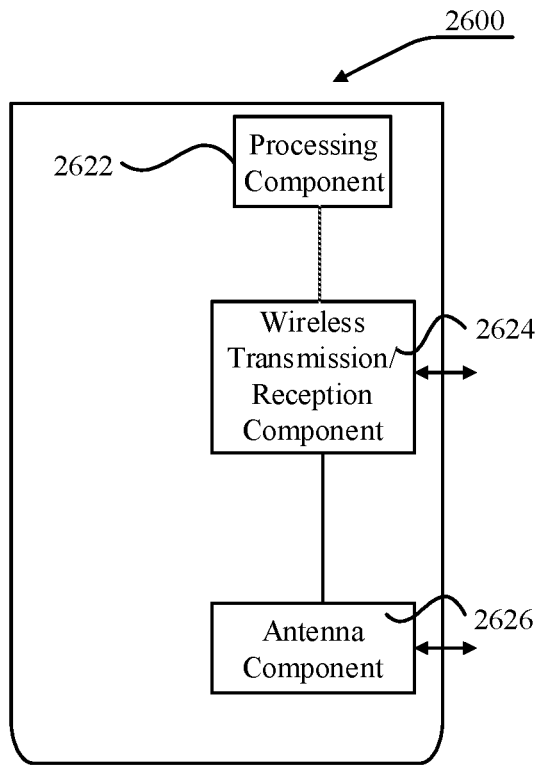
FIG. 26 is a block diagram illustrating a sidelink-based transmission apparatus according to an example of the present disclosure.

As illustrated in FIG. 26, which is a schematic structural diagram illustrating a sidelink-based transmission apparatus 2600 according to an example, the apparatus 2600 may be provided as a transmitter device. Referring to FIG. 26, the apparatus 2600 includes a processing component 2622, a wireless transmission/reception component 2624, an antenna component 2626, and a signal processing part peculiar to a wireless interface. The processing component 2622 may further include one or more processors.

One of the processors in the processing component 2622 may be configured to execute any one of the foregoing sidelink-based transmission methods applicable to the transmitter.

Correspondingly, the present disclosure also provides a sidelink-based transmission apparatus, which is applicable to a receiver and includes:
- a processor; and
- a memory, configured to store instructions executable by the processor;
- where the processor is configured to:
- receive control information, target data, and a demodulation reference signal which are transmitted by a transmitter through a time unit, where the target data is associated with the control information, the demodulation reference signal is shared by the control information and the target data, and the control information, the target data, and the demodulation reference signal are mapped onto the time unit by using time-division multiplexing; and
- demodulate the control information and the target data respectively from the time unit based on the demodulation reference signal.

Figure 27:
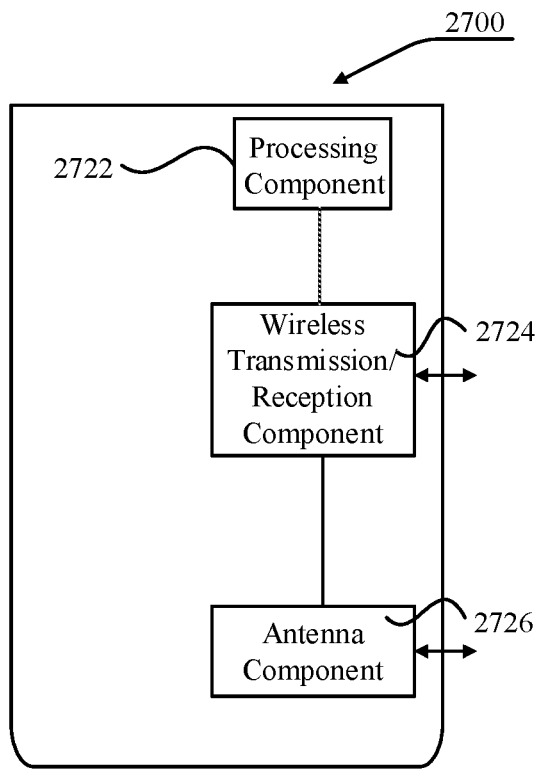
FIG. 27 discloses a block diagram illustrating another sidelink-based transmission apparatus according to an example.

As illustrated in FIG. 27, which is a schematic structural diagram illustrating a sidelink-based transmission apparatus 2700 according to an example, the apparatus 2700 may be provided as a receiver device. Referring to FIG. 27, the apparatus 2700 includes a processing component 2722, a wireless transmission/reception component 2724, an antenna component 2726, and a signal processing part peculiar to a wireless interface. The processing component 2722 may further include one or more processors.

One of the processors in the processing component 2722 may be configured to execute any one of the foregoing sidelink-based transmission methods applicable to the receiver.

The technical solutions provided by the embodiments of the present disclosure may produce the following beneficial effects.

In the embodiments of the present disclosure, a transmitter may configure a shared demodulation reference signal for to-be-transmitted control information and to-be-transmitted target data, thereby reducing an overhead on demodulation reference signal and improving a utilization rate of frequency spectrum. In addition, the transmitter may use time-division multiplexing to map the control information, the target data, and the demodulation reference signal onto a current time unit, and transmit the control information, the target data, and the demodulation reference signal to a receiver through the time unit, thereby succeeding in transmitting the control information, the target data, and the demodulation reference signal on the basis of time-division multiplexing in a sidelink communication system.

In the embodiment of the present disclosure, the demodulation reference signal is not included in a time symbol on which the control information is located, and thus the demodulation reference signal may be mapped onto a first target time symbol of the time unit by using time-division multiplexing. The first target time symbol is located between a time symbol onto which the control information is mapped and a time symbol onto which the target data is mapped. During the above process, when the demodulation reference signal is not included in the time symbol on which the control information is located, it can succeed in transmitting the control information, the target data, and the demodulation reference signal on the basis of time-division multiplexing, which has high availability.

In the embodiments of the present disclosure, the demodulation reference signal may be included in a time symbol on which the control information is located. Accordingly, the control information and the target data may be mapped onto different time symbols of the time unit by using time-division multiplexing. In some embodiments, the transmitter may further map the demodulation reference signal onto at least one second target time symbol of the time unit. The second target time symbol is located between any two time symbols onto which the target data is mapped. Therefore, when the demodulation reference signal is included in the time symbol on which the control information is located, it can succeed in transmitting the control information, the target data, and the demodulation reference signal on the basis of time-division multiplexing.

In the embodiment of the present disclosure, the demodulation reference signal is not included in a time symbol on which the control information is located, and thus the demodulation reference signal may be mapped onto at least one third target time symbol of the time unit, and then simultaneously map the control information onto a fourth target time symbol and a fifth target time symbol. That is, the control information is mapped onto the time symbols which are before and behind the third target time symbol. Further, the target data is mapped onto at least one sixth target time symbol which is behind the fifth target time symbol or before the fourth target time symbol. Therefore, when the demodulation reference signal is not included in the time symbol on which the control information is located, it can succeed in transmitting the control information, the target data, and the demodulation reference signal on the basis of time-division multiplexing, which has high availability.

In the embodiments of the present disclosure, the transmitter may also use frequency-division multiplexing to map a part of the target data onto a time symbol on which the demodulation reference signal is located, thereby saving transmission resources. Through the above process, the control information, the target data, and the demodulation reference signal may be transmitted in the sidelink communication by using time-division multiplexing and frequency-division multiplexing simultaneously, which further meets respective requirements of different V2X services.

In the embodiments of the present disclosure, when time-division multiplexing is used, frequency domain resources occupied by the control information overlap with a part of frequency domain resources occupied by the target data, or the frequency domain resources occupied by the control information overlap with all of the frequency domain resources occupied by the target data. In some embodiments, in the case that the frequency domain resources occupied by the control information overlap with the part of the frequency domain resources occupied by the target data, the transmitter may also map a part of the target data onto a time symbol on which the control information is located. Similarly, the control information, the target data, and the demodulation reference signal are transmitted in the sidelink communication by using time-division multiplexing and frequency-division multiplexing simultaneously, which further meets respective requirements of different V2X services.

In the embodiments of the present disclosure, the transmitter may adopt a same precoding matrix and a same transmitting beam and transmit the control information, the target data, and the demodulation reference signal to the receiver through the time unit, which saves transmission resources.

In the embodiments of the present disclosure, a receiver may receive control information, target data, and a demodulation reference signal which are transmitted by a transmitter through a time unit. The target data is associated with the control information, the demodulation reference signal is shared by the control information and the target data, and the control information, the target data, and the demodulation reference signal are mapped onto the time unit by using time-division multiplexing. Further, the receiver may demodulate the control information and the target data respectively from the time unit based on the demodulation reference signal. Therefore, it succeeds in transmitting the control information, the target data, and the demodulation reference signal on the basis of time-division multiplexing in a sidelink communication system.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The description and the examples are only illustrative, and the true scope and spirit of the present disclosure are set forth in the appended claims.

It is to be understood that the present disclosure is not limited to the precise structure described above and illustrated in the accompanying drawings, and that various modifications and changes can be made without departing from the scope thereof. The scope of the present disclosure is only limited by the appended claims.

The invention claimed is:
1. A sidelink-based transmission method, comprising:
configuring, by a transmitter, a shared demodulation reference signal for control information and target data, wherein the target data indicates to-be-transmitted data associated with the control information;
mapping, by the transmitter, three types of objects comprising the control information, the target data, and the shared demodulation reference signal onto a time unit by using time-division multiplexing; and
transmitting, by the transmitter, the control information, the target data, and the shared demodulation reference signal to a receiver through the time unit on the basis of time-division multiplexing.
2. The method according to claim 1,
wherein the shared demodulation reference signal is not comprised in a time symbol on which the control information is located; and
wherein mapping the three types of objects comprising the control information, the target data, and the shared demodulation reference signal onto the time unit by using time-division multiplexing comprises:
mapping the control information, the target data, and the shared demodulation reference signal onto different time symbols of the time unit by using time-division multiplexing, wherein the shared demodulation reference signal is mapped onto at least one first target time symbol of the time unit, and wherein the first target time symbol is located between a time symbol onto which the control information is mapped and a time symbol onto which the target data is mapped.

3. The method according to claim 1,
wherein at least a part of the shared demodulation reference signal is comprised in a time symbol on which the control information is located; and
wherein mapping the three types of objects comprising the control information, the target data, and the shared demodulation reference signal onto the time unit by using time-division multiplexing comprises:
mapping the control information and the target data onto different time symbols of the time unit by using time-division multiplexing.

4. The method according to claim 3, wherein mapping the three types of objects comprising the control information, the target data, and the shared demodulation reference signal onto the time unit by using time-division multiplexing further comprises:
mapping another part of the shared demodulation reference signal onto at least one second target time symbol of the time unit, wherein the second target time symbol is located between any two time symbols onto which the target data is mapped.

5. The method according to claim 1,
wherein the shared demodulation reference signal is not comprised in a time symbol on which the control information is located; and
wherein mapping the three types of objects comprising the control information, the target data, and the shared demodulation reference signal onto the time unit by using time-division multiplexing comprises:
mapping the shared demodulation reference signal onto at least one third target time symbol of the time unit;
mapping the control information onto a fourth target time symbol and a fifth target time symbol simultaneously, wherein the fourth target time symbol is located in the time unit and before the third target time symbol, and the fifth target time symbol is located in the time unit and behind the third target time symbol; and
mapping the target data onto at least one sixth target time symbol, wherein the sixth target time symbol is located behind the fifth target time symbol, before the fourth target time symbol, or behind the fifth target time symbol and before the fourth target time symbol.

6. The method according to claim 1, wherein before transmitting the control information, the target data, and the shared demodulation reference signal to the receiver through the time unit on the basis of time-division multiplexing, the method further comprises:
mapping, by using frequency-division multiplexing, a part of the target data onto a time symbol on which the shared demodulation reference signal is located.

7. The method according to claim 1, wherein
frequency domain resources occupied by the control information overlap with a part of frequency domain resources occupied by the target data; or
the frequency domain resources occupied by the control information overlap with all of the frequency domain resources occupied by the target data.

8. The method according to claim 7, wherein in response to determining that the frequency domain resources occupied by the control information overlap with the part of the frequency domain resources occupied by the target data, before transmitting the control information, the target data, and the shared demodulation reference signal to the receiver through the time unit on the basis of time-division multiplexing, the method further comprises:
mapping, by using frequency-division multiplexing, a part of the target data onto a time symbol on which the control information is located.

9. The method according to claim 1, wherein transmitting the control information, the target data, and the shared demodulation reference signal to the receiver through the time unit on the basis of time-division multiplexing comprises:
transmitting, by adopting a same precoding matrix and a same transmitting beam, the control information, the target data, and the shared demodulation reference signal to the receiver through the time unit on the basis of time-division multiplexing.

10. A sidelink-based transmission method, comprising:
receiving, by a receiver, control information, target data, and a shared demodulation reference signal transmitted by a transmitter through a time unit on the basis of time-division multiplexing, wherein the target data is associated with the control information, the shared demodulation reference signal is configured for the control information and the target data, and three types of objects comprising the control information, the target data, and the demodulation reference signal are mapped onto the time unit by using time-division multiplexing; and
demodulating, by the receiver, the control information and the target data respectively from the time unit based on the shared demodulation reference signal.

11. A sidelink-based transmission apparatus for implementing the method according to claim 10, comprising:
a processor; and
a memory, configured to store instructions executable by the processor;
wherein the processor is configured to:
receive control information, target data, and a shared demodulation reference signal transmitted by a transmitter through a time unit on the basis of time-division multiplexing, wherein the target data is associated with the control information, the shared demodulation reference signal is configured for the control information and the target data, and three types of objects comprising the control information, the target data, and the shared demodulation reference signal are mapped onto the time unit by using time-division multiplexing; and
demodulate the control information and the target data respectively from the time unit based on the shared demodulation reference signal.

12. A sidelink-based transmission apparatus, comprising:
a processor; and
a memory, configured to store instructions executable by the processor;
wherein the processor is configured to:
configure a shared demodulation reference signal for control information and target data, wherein the target data indicates to-be-transmitted data associated with the control information;
map three types of objects comprising the control information, the target data, and the shared demodulation reference signal onto a time unit by using time-division multiplexing; and
transmit the control information, the target data, and the shared demodulation reference signal to a receiver through the time unit on the basis of time-division multiplexing.

13. The apparatus according to claim 12,
wherein the shared demodulation reference signal is not comprised in a time symbol on which the control information is located; and
wherein the processor is configured to map the three types of objects comprising the control information, the target data, and the shared demodulation reference signal onto the time unit by using time-division multiplexing, comprises that the processor is configured to:
map the control information, the target data, and the shared demodulation reference signal onto different time symbols of the time unit by using time-division multiplexing; wherein the shared demodulation reference signal is mapped onto at least one first target time symbol of the time unit; and wherein the first target time symbol is located between a time symbol onto which the control information is mapped and a time symbol on which the target data is mapped.

14. The apparatus according to claim 12,
wherein at least a part of the shared demodulation reference signal is comprised in a time symbol on which the control information is located; and
wherein the processor is configured to map the three types of objects comprising the control information, the target data, and the shared demodulation reference signal onto the time unit by using time-division multiplexing, comprises that the processor is configured to:
map the control information and the target data onto different time symbols of the time unit by using time-division multiplexing.

15. The apparatus according to claim 14, wherein the processor is configured to map the three types of objects comprising the control information, the target data, and the shared demodulation reference signal onto the time unit by using time-division multiplexing further comprises that the processor is configured to:
map another part of the shared demodulation reference signal onto at least one second target time symbol of the time unit; wherein the second target time symbol is located between any two time symbols onto which the target data is mapped.

16. The apparatus according to claim 12,
wherein the shared demodulation reference signal is not comprised in a time symbol on which the control information is located; and
wherein the processor is configured to map the three types of objects comprising the control information, the target data, and the shared demodulation reference signal onto the time unit by using time-division multiplexing comprises that the processor is configured to:
map the shared demodulation reference signal onto at least one third target time symbol of the time unit;
map the control information onto a fourth target time symbol and a fifth target time symbol simultaneously; wherein the fourth target time symbol is located in the time unit and before the third target time symbol, and the fifth target time symbol is located in the time unit and behind the third target time symbol; and
map the target data onto at least one sixth target time symbol; wherein the sixth target time symbol is located behind the fifth target time symbol, before the fourth target time symbol, or behind the fifth target time symbol and before the fourth target time symbol.

17. The apparatus according to claim 12, wherein before the processor is configured to transmit the control information, the target data, and the shared demodulation reference signal to the receiver through the time unit on the basis of time-division multiplexing, the processor is further configured to:
map, by using frequency-division multiplexing, a part of the target data onto a time symbol on which the shared demodulation reference signal is located.

18. The apparatus according to claim 12, wherein
frequency domain resources occupied by the control information overlap with a part of frequency domain resources occupied by the target data; or
the frequency domain resources occupied by the control information overlap with all of the frequency domain resources occupied by the target data.

19. The apparatus according to claim 18, wherein in response to determining that the frequency domain resources occupied by the control information overlap with the part of the frequency domain resources occupied by the target data, before the processor is configured to transmit the control information, the target data, and the shared demodulation reference signal to the receiver through the time unit on the basis of time-division multiplexing, the processor is further configured to:
map, by using frequency-division multiplexing, a part of the target data onto a time symbol on which the control information is located.

20. The apparatus according to claim 12, wherein the processor is configured to transmit the control information, the target data, and the shared demodulation reference signal to the receiver through the time unit on the basis of time-division multiplexing comprises that the processor is configured to:
transmit, by adopting a same precoding matrix and a same transmitting beam, the control information, the target data, and the shared demodulation reference signal to the receiver through the time unit on the basis of time-division multiplexing.

* * * * *